United States Patent
Beraud et al.

(10) Patent No.: US 9,205,603 B2
(45) Date of Patent: Dec. 8, 2015

(54) VEILED TAPE WITH IMPROVED RESISTANCE TO DELAMINATION

(75) Inventors: Jean-Marc Beraud, Rives (FR); Jacques Ducarre, Corbelin (FR); Jean-Benoit Thiel, La Chapelle de la Tour (FR)

(73) Assignee: Hexcel Reinforcements, Dagneux (FR)

( * ) Notice: Subject to any disclaimer, the term of this patent is extended or adjusted under 35 U.S.C. 154(b) by 0 days.

(21) Appl. No.: 14/117,090

(22) PCT Filed: May 31, 2012

(86) PCT No.: PCT/EP2012/060238
§ 371 (c)(1),
(2), (4) Date: Nov. 12, 2013

(87) PCT Pub. No.: WO2012/164014
PCT Pub. Date: Dec. 6, 2012

(65) Prior Publication Data
US 2014/0322511 A1   Oct. 30, 2014

(30) Foreign Application Priority Data

Jun. 1, 2011  (FR) ....................................... 11 54840

(51) Int. Cl.
| | | |
|---|---|---|
| B29C 70/52 | (2006.01) | |
| B29C 70/02 | (2006.01) | |
| B29C 70/20 | (2006.01) | |
| B29C 70/50 | (2006.01) | |
| B32B 5/02 | (2006.01) | |
| B32B 5/26 | (2006.01) | |
| B32B 5/28 | (2006.01) | |

(52) U.S. Cl.
CPC ............... *B29C 70/021* (2013.01); *B29C 70/20* (2013.01); *B29C 70/506* (2013.01); *B32B 5/022* (2013.01); *B32B 5/26* (2013.01); *B32B 5/28* (2013.01); *B32B 2250/03* (2013.01); *B32B 2250/20* (2013.01); *B32B 2250/40* (2013.01); *B32B 2260/021* (2013.01); *B32B 2260/046* (2013.01); *B32B 2262/0261* (2013.01); *B32B 2262/106* (2013.01); *B32B 2264/0214* (2013.01); *Y10T 442/671* (2015.04)

(58) Field of Classification Search
CPC ...... B29C 70/20; B29C 70/021; B32B 5/022; B32B 5/26; B32B 5/28; B32B 2250/03; B32B 2250/20; B32B 2250/40
USPC ...................... 156/166, 178, 179, 180; 428/74
See application file for complete search history.

(56) References Cited

U.S. PATENT DOCUMENTS

| | | | |
|---|---|---|---|
| 5,445,693 A | 8/1995 | Vane | |
| 2005/0048280 A1 | 3/2005 | Stamper et al. | |
| 2006/0137156 A1* | 6/2006 | Kawabe et al. | ................. 28/271 |
| 2012/0015135 A1* | 1/2012 | Beraud et al. | ................... 428/74 |
| 2012/0015167 A1 | 1/2012 | Beraud et al. | |
| 2012/0207966 A1* | 8/2012 | Dickson | ........................ 428/110 |

FOREIGN PATENT DOCUMENTS

| | | |
|---|---|---|
| EP | 0554950 | 11/1995 |
| EP | 1300507 | 4/2003 |
| JP | 2009-235175 | 10/2009 |
| WO | 92/20521 | 11/1992 |
| WO | WO 2007016382 A2 * | 2/2007 |
| WO | 2010/046609 | 4/2010 |
| WO | 2010/061114 | 6/2010 |

* cited by examiner

*Primary Examiner* — Michael N Orlando
*Assistant Examiner* — Vishal I Patel
(74) *Attorney, Agent, or Firm* — W. Mark Bielawski; David J. Oldenkamp (57) ABSTRACT

The present invention provides a method of preparing a tape with a given width, said tape being composed of an assembly of filaments extending in a direction substantially parallel to the length of the tape, and between which a powder of a polymeric material is distributed, each face of said tape being associated with a nonwoven of polymeric fibers, the method comprising: —a step consisting in depositing powder formed from a polymeric material on at least one of the faces of the tape, preferably on both faces; —a step consisting in heating in order to at least partially soften the deposited powder then of tightening the tape in order to adjust its width to the width desired and to cause at least a portion of the powder to penetrate into the thickness of the tape between the filaments, and of cooling the tape to fix its width and provide cohesiveness because of the powder; and—to tapes obtained using said method.

20 Claims, 4 Drawing Sheets

VEILED TAPE WITH IMPROVED RESISTANCE TO DELAMINATION

The present invention relates to the technical field of reinforcing materials adapted to making up composite parts. More precisely, the invention relates to a novel intermediate material for producing composite parts by subsequent injection or infusion of thermosetting resin, in the form of a veiled tape with an improved resistance to delamination.

Composite parts or articles, i.e. comprising both one or more pieces of reinforcement or fibrous sheets and also a matrix made principally of the thermosetting (resin) type and that may include thermoplastics, may, for example, be produced by using a "direct" or "LCM" (liquid composite molding) method. A direct method is defined by the fact that one or more pieces of fibrous reinforcement are used in the "dry" state (i.e. without the final matrix), the resin or matrix being employed separately, for example by injection into the mold containing the fibrous reinforcement ("RTM" method, resin transfer molding), by infusion through the thickness of the fibrous reinforcement (the "LRI" or liquid resin infusion method, or the "RFI" or resin film infusion method) or by manual coating/impregnation, using a roller or brush, onto each of the individual layers of fibrous reinforcement, applied in succession to the form.

Other methods known as indirect methods use pre-impregnated materials that already comprise a sufficient quantity of resin to make up the desired composite part. Such materials are in particular those described in documents US 2005/048280, WO 92/20521 and EP 0 554 950.

For RTM, LRI, or RFI methods, in general a fibrous preform needs to be produced in the shape of the desired finished article, and then that preform is impregnated with a resin. The resin is injected or infused by pressure or temperature differentials, and then once all of the necessary quantity of resin is contained in the preform, the impregnated preform is heated to a higher temperature in order to carry out the cycle of polymerization/curing and thus cause it to harden.

The composite parts used in the automotive, aviation, or shipbuilding industries in particular are governed by very strict regulations, in particular in terms of mechanical properties. It is thus particularly important to have access to materials that are both extremely regular and also easy to handle and use.

In those sectors, a large number of preforms are produced that are based on reinforcing materials, formed from carbon fibers, in particular of the unidirectional type. In order to satisfy the high standards in terms of quality and productivity demanded in the aviation sector in particular, it is becoming ever more necessary to use automated methods.

The prior art proposes unidirectional sheets of reinforcing yarns in which the cohesiveness between the yarns is ensured by thermoplastic or glass/thermoplastic binding yarns, which may be woven or nonwoven, that extend transversely to the reinforcing yarns. Such sheets are, for example, supplied under the references PW-BUD by SIGMATEX UK Limited, Runcorn, Cheshire WA7 1TE, United Kingdom) or with other denominations (the TeXtreme® range from OXEON (Norrby Langata 4S, SE-50435, Boras, Sweden).

Other documents such as Japanese patent application JP 2009-235175, proposes depositing a thermosetting resin powder on a fabric type or unidirectional fibrous type support surface in order to provide a base material for producing a preform that has excellent deformability, form stability, good permeability to air, and satisfactory impregnability by resin. Japanese patent application JP 2009 235175 also proposes the same type of intermediate material adapted to the RTM method that can be readily molded and shaped to produce a preform and that can avoid the loss of properties suffered by an interply preform.

In order to provide yarns with better cohesiveness, the Applicant has proposed associating each face of a unidirectional reinforcing sheet with a nonwoven that could result in a more continuous bond compared with the spot bonds obtained with binding yarns or powder. Such materials are described in particular in patent application WO 2010/046609. Next, in patent application WO 2010/061114, the Applicant has described a method of producing unidirectional sheets with a given width that have high regularity, adapted to direct methods of producing composite parts from one or more yarns, while limiting material losses. Such a method can in particular be used to obtain controlled width veiled yarns that can then be used to manufacture preforms with a plurality of layers directly using an automated lay-up device. Another route consists in using them in order to make up woven or braided reinforcements that can then be stacked to produce composite preforms or parts using a direct method.

When using the veiled tapes previously proposed by the Applicant, it has been observed that during automated lay-up of a veiled tape, it is bonded to the preceding ply by a combination of a pressure and heating action followed by cooling, where cooling is possibly accomplished without adding a specific coolant, by using a "natural" route. The tape is thus bonded to the preceding ply via its lower face, and that mechanical bond, which is subjected to shear all the time the tape is being laid-up, is of an intensity proportional to the (lay-up tension)/(bonded length) ratio. The lay-up tension is generally assumed to be constant, and so the shear stress is higher during the first centimeters of lay-up and decreases as the length of the laid-up tape increases. The shear force is distributed over the whole thickness of the tape and if the lay-up tension is too high, delamination of the tape in its central zone has been observed in some cases by the Applicant, during the first centimeters of laying-up. In fact, the Applicant has observed that in such materials associating a tape of unidirectional fibers with each of its two faces carrying a thermoplastic veil, a preferential mechanical bond is established between the filaments located on the main faces of the tape and the veil, while the central zone of the tape, made up solely of filaments, corresponds to the zone with a lower shear strength.

That phenomenon may also be accentuated when a roller is used to deposit the tape. Under such circumstances, during the very first millimeters of bonding of the tape, the face in contact with the roller has a tendency to adhere to it, which further encourages delamination of the tape when its other face is then bonded to the preceding ply.

The Applicant has also observed the same phenomenon of shear of the yarn when laying up the tape along a trajectory that is curved in its plane, also known as "steering lay-up". During this lay-up, the deposited tape undulates with an intensity that increases as the radius of lay-up decreases under the shear stress due to the surplus length of the filaments present on the internal radius of the tape compared with the filaments located on the outer edge of said tape.

In this context, in order in particular to improve upon problems of delamination that sometimes arise with the veiled tapes described in patent applications WO 2010/046609 and WO 2010/061114, the present invention proposes a method of preparing a tape with a given width, said tape being composed of an assembly of reinforcing filaments extending in a direction substantially parallel to the length of the tape, and between which a powder of a polymeric material is distributed, each face of said tape being associated with a nonwoven of polymeric fibers, the method comprising the following steps in succession:

a) providing a tape of reinforcing filaments extending in a direction substantially parallel to the length of the tape and having a width that is greater than the desired width for the final tape;

b) depositing resin powder formed from a polymeric material on at least one of the faces of the tape;

c) heating in order to at least partially soften the deposited powder, then tightening the tape, so as to adjust its width to the desired width and cause at least a portion of the powder to penetrate into the thickness of the tape between the filaments, and cooling the tape in order to fix its width and provide cohesiveness because of the powder;

d) associating, by heat bonding, each face of the tape with a nonwoven formed from polymeric fibers.

Preferably, when the powder is deposited, the width of the tape is more than 50% larger, or even at least 100% larger than the desired width of the final tape.

In most circumstances, the method of the invention includes, upstream of step a), a step of fanning out the tape, consisting in spreading the tape directly unwound from commercial spools so as to obtain the desired width for the tape of step a).

Preferably, the method of the invention is carried out on a continuous production line, at least up to the outlet from step c). In such a continuous method, the width of the tape thus reduces continuously from step a) (or the fanning out step) to step c), until the tape reaches a tightening station that can calibrate the width of the yarn by shrinking the width of the tape to the desired width.

In accordance with a particular implementation, the method of the invention includes a step of fanning out the tape, preferably to a width that is greater than the desired width for the final tape by at least 100%. Then, when the powder is deposited, the width of the tape is usually less than that obtained at the outlet from the fanning out step, but preferably the width of the tape at the start of step b) is less than the width of the tape obtained after fanning out by at least 20%.

In accordance with a particular implementation that may be combined with the above implementations, the method of the invention includes a traverse winding step between the steps c) and d). Traverse winding consists in winding the powdered tape obtained before it is associated with the nonwovens, turn by turn and layer by layer, onto a winding support of the spool type. The method is then continuous until the traverse winding step when the calibrated tape obtained is wound onto a winding support. Next, the tape is taken and unwound from the winding support for lamination with the veils.

In accordance with a particular implementation that may be combined with the above implementations, the weight of the powder (more precisely formed from a thermoplastic or thermosetting polymer) represents 0.5% to 8%, preferably 1% to 4% of the total weight (filaments+powder+nonwovens) of the final tape. This quantity corresponds to a compromise between a quantity that is sufficiently high to increase performance in terms of resistance to delamination and a quantity that is sufficiently low to avoid rigidification of the tape.

In accordance with a particular implementation that may be combined with the above implementations, the total weight of nonwovens represents less than 15% of the total weight (filaments+powder+nonwovens) of the final tape, preferably 0.1% to 10% and preferentially 2% to 10% of the total weight of the final tape. Thus, the tape that is then obtained is ideally suited to methods known as "direct" or "LCM" (liquid composite molding) methods.

The tapes may then be used to directly produce preforms with a plurality of layers using an automated lay-up device. If the tapes do not have the desired width for each layer to be stacked, said tapes may be disposed parallel relative to one another in a contiguous or non-contiguous manner to form successive layers that need to be stacked one on top of the other, at least some of them extending in different directions. It is also possible to use powdered veiled tapes to form fabrics or braids in which the veiled tapes of the invention are crossed and interlaced so as to be woven or braided. Thus, it is these fabrics or braids that are stacked to make up the part or preform. The powdered veiled tapes obtained could then be used for producing preforms or composite parts, for example by injecting resin into the mold containing them ("RTM" method, resin transfer molding), by infusion through the thickness formed by the arrangement of said tapes (the "LRI", liquid resin infusion, method or the "RFI", resin film infusion, method) or by manual coating/impregnation, using a roller or brush, onto each of the individual layers made up of said tapes, applied in succession to the form.

In accordance with a particular implementation that may be combined with the above implementations, step d) for associating the powdered tape with nonwovens is carried out in accordance with the method described in patent application WO 2010/061114, reference to which should be made for further details. Such a method has the advantage of allowing complete control of the width of the tapes obtained. In particular, the nonwovens associated with the tape of step d) have a width that is greater than the width of the tape when said association occurs and cutting or hot sublimation of the nonwovens is carried out at each edge of the tape, in order to remove any surplus. Preferably, both the tape and also the cut or sublimated portions either side of its edges are entrained by entrainment means or suction means.

The method of the invention is ideally suited to any type of reinforcing tapes used for producing composite parts. In particular, the filaments are formed from a material selected from the following materials: carbon, glass, aramid, silica, ceramic, and mixtures thereof. The invention is nevertheless more particularly suited to tapes made up of carbon filaments.

The nature of the nonwoven and the powder are not limiting factors in the context of the invention. One or the other may be formed from a polymer or from a mixture of thermoplastic or thermosetting polymers. By way of example, the nonwovens and the powder, which are generally formed from different materials, may be selected from a material selected from: polyamides (PA: PA6, PA12, PA11, PA6,6, PA 6,10, PA 6,12, etc.), copolyamides (CoPA), polyamides—block ether or ester (PEBAX, PEBA), polyphthalamide (PPA), polyesters (polyethylene terephthalate—PET—, polybutylene terephthalate—PBT—etc.), copolyesters (CoPE), thermoplastic polyurethanes (TPU), polyacetals (POM, etc.), polyolefins (PP, HDPE, LDPE, LLDPE etc.), polyethersulfones (PES), polysulfones (PSU etc.), polyphenylene sulfones (PPSU etc.), polyetheretherketones (PEEK), polyetherketoneketone (PEKK), poly(phenylene sulfide) (PPS), or polyetherimides (PEI), thermoplastic polyimides, liquid crystal polymers (LCP), phenoxys, block copolymers such as styrene-butadiene-methylmethacrylate copolymers (SBM), methylmethacrylate-butyl acrylate-methylmethacrylate copolymers (MAM), epoxies, and mixtures thereof.

The present invention also pertains to a tape composed of an assembly of filaments extending in a direction parallel to the length of the tape, and between which a powder formed from a polymeric material is distributed, at least a portion of the powder being located in the thickness of the tape, each face of said tape being associated with a nonwoven formed from polymeric fibers, the cohesiveness of said tape being provided both by the powder and also by the veils.

In particular embodiments, over the entire length of the tape the width of the tape has a standard deviation that is in particular less than 0.25 mm [millimeter], preferably less than 0.22 mm and preferentially 0.20 mm or less, and/or the tape does not have cut fibers on said longitudinal edges. The width of the veiled tapes and the standard deviation may be determined using the method described in the examples of application WO 2010/061114. The standard deviation may be defined as the root mean square of deviations from the mean, i.e.:

$$\sqrt{\frac{1}{n}\sum_i (x_i - \bar{x})^2} \quad (1)$$

where:
- n=number of values;
- $x_i$=a value
- $\bar{x}$=arithmetic mean.

The invention also provides said tapes that can be obtained using the method as defined in the context of the invention, in any one of the particular implementations of the method.

The description below, made with reference to the accompanying figures, provides more details of the invention and a better understanding of the various steps of the method.

In order to understand the details of the description better, some definitions of the terms used are set out here.

The term "polymeric material" means any type of thermosetting or thermoplastic polymer or any mixture of such polymers. In particular, the nonwovens will be formed from a thermoplastic material and the powder from a thermosetting or thermoplastic material.

The term "tape" or "band" means a sheet material that has a length that is much greater than its width. In general, the tapes prepared using the method of the invention are very long; they might correspond to the length of commercially available yarns. As an example, their length may be in the range 1500 linear meters (lm) for high weights to 10000 lm for smaller weights.

The term "nonwoven" or "veil" means a disorganized assembly of continuous or short fibers. In particular, the constituent fibers of a nonwoven have mean diameters in the range from 0.5 μm [micrometer] to 70 μm. For example, in a short staple nonwoven, the fibers have a length in the range 1 mm [millimeter] to 100 mm. In the context of the invention, the constituent fibers of the veil are advantageously made up of a thermoplastic material.

A tape may be made up of an assembly of yarns or by a single yarn. The method of the invention is particularly suited to circumstances in which the tape is made up of a single yarn that is an assembly of filaments, but the invention extends to circumstances in which a plurality of yarns are used to make up a tape. In all circumstances, the filaments or reinforcing fibers are disposed so as to provide complete or quasi-complete coverage over the whole tape surface. In particular, when the veiled tape is made up of a unidirectional sheet of a plurality of yarns, the yarns are disposed edge to edge. When the tape undergoes a fanning out step, it is spread out, minimizing or even avoiding any gaps.

A yarn is made up of an assembly of filaments and generally comprises, for carbon yarns, 1000 to 80000 filaments, advantageously 12000 to 24000 filaments. The reinforcing yarns used in the context of the invention are preferably formed from a material selected from carbon, ceramics, glasses, silicas, basalts, and aramids, or any other material used in the composite materials field; the fibers may be natural or synthetic. However, carbon is particularly preferred. Particular ceramics that may be used are silicon carbide and refractory oxides, for example alumina and zirconia. Particularly preferably in the context of the invention, 1K to 24K carbon yarns, preferably 12K and 24K, are used. The constituent fibers are preferably continuous. The yarns used generally have a cross section that is substantially circular (termed round yarns) or, as is preferable, substantially rectangular or elliptical (known as flat yarns). Such yarns have a certain width and thickness. By way of example, a 3K flat carbon yarn with a weight of 200 Tex generally has a width of 1 mm to 3 mm, a 12K flat carbon yarn with a weight of 446 Tex has a width of 2 mm to 5 mm, a 12K flat yarn with a weight of 800 Tex has a width in the range 3 mm to 7 mm, a 24K flat carbon yarn with a weight of 1600 Tex has a width of 5 mm to 12 mm, and a 24K flat carbon yarn with a weight of 1040 Tex has a width of 5 mm to 10 mm. A flat carbon yarn of 3000 to 24000 filaments will thus usually be 1 mm to 12 mm wide. Carbon yarns can be classified as either high strength (HS) yarns with a tensile modulus in the range 220 GPa [gigapascals] to 241 GPa and with a tensile breaking stress in the range 3450 MPa [megapascals] to 4830 MPa, intermediate modulus (IM) yarns with a tensile modulus in the range 290 GPa to 297 GPa and with a tensile breaking stress in the range 3450 MPa to 6200 MPa, and high modulus (HM) yarns with a tensile modulus in the range 345 GPa to 448 GPa and with a tensile breaking stress in the range 3450 MPa to 5520 MPa (see the "ASM Handbook", ISBN 0-87170-703-9, ASM International 2001).

The tape is made up of one or more yarns. When the tape is made up of a plurality of yarns, it is the assembly of the yarns (and not each yarn taken individually) that undergoes the steps of fanning out, powder application, tightening, and optional traverse winding in succession, followed by association with the nonwovens to produce a final tape of the given width.

Figure 1:
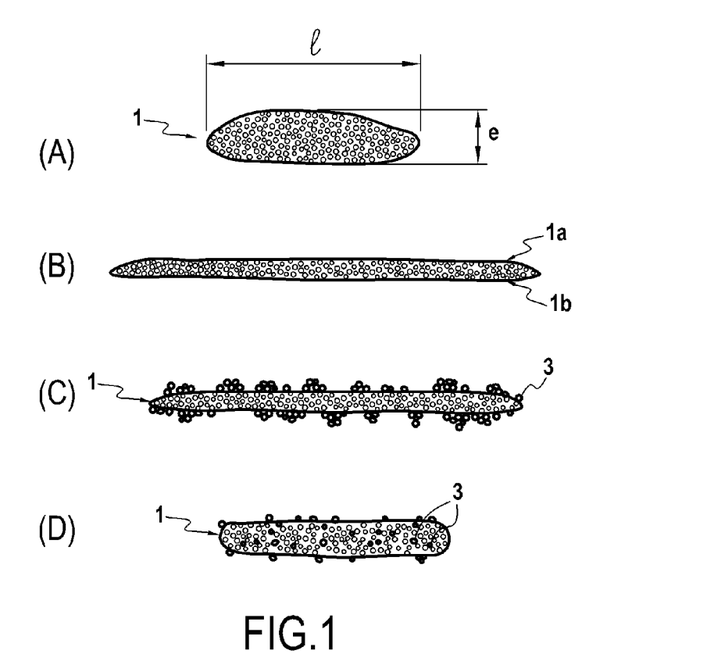
FIG. 1 presents diagrammatic sectional views of a tape at different steps (A), (B), (C), and (D) of the method of the invention. In order to facilitate comprehension, the ratio of the particle size to that of the filaments has not been adhered to, nor has the homogeneous distribution of the powder over the surface in FIG. 1(C).

FIG. 1 diagrammatically shows the cross section of a tape before the fanning out step (A), after the fanning out step (B), when powder has been applied (C), and when tightened (D).

This figure shows that the step of fanning out the tape 1 results in spreading of the filaments 2 such that the width l of the tape increases and its thickness e decreases. Powder application may then be carried out on the surface of the tape, grains or particles 3 of powder being positioned exclusively on the major faces 1a and/or 1b of the tape. In the example illustrated in FIG. 1, powder application is carried out on the upper face of the tape, but applying powder to two faces may clearly be envisaged, in particular electrostatically. Next, tightening of the yarn causes a reduction in the width l of the tape and an increase in its thickness e and allows at least some of the grains or particles 3 of powder to penetrate into the thickness of the tape and be found in the inter-filament spaces located inside the tape. The grains or particles 3 of powder are thus no longer exclusively on the surface. In most circumstances, it can be estimated that at least 30% of the weight of the powder is not in contact with the outer surface of the tape. This percentage may be roughly estimated by the ratio of the difference in width l of the tape at the powder application stage (FIG. 1(C)) to the width l of tape obtained by means of calibration (FIG. 1(D)) over the width l of the tape at the powder application stage (FIG. 1(C)) times 100, i.e. $(l_{1C}-l_{1D})\times 100/l_{1C}$.

In the context of the invention, it has been demonstrated that applying powder to the core means that the cohesiveness of the tape can be modified in a highly favorable manner irrespective of its weight per unit area, and thus its resistance to delamination is improved.

The mean particle size is preferably in the range 10 micrometers to 70 micrometers. The term "mean size" means the median diameter of the particles, which are generally substantially spherical, denoted $D_{50}$, which corresponds to the diameter that divides the distribution by volume of the particles into two portions of equal areas. Such a median diameter may be measured as detailed in the examples.

Advantageously, the median diameter $D_{50}$ of the powder particles must not exceed 10 times the diameter of the filaments, or even 5 times the diameter of the filaments. The diameter of the carbon filaments is generally in the range 2 micrometers to 50 micrometers for carbon filaments and is usually in the range 5 micrometers to 8 micrometers (from PAN) or in the range 10 micrometers to 20 micrometers (from pitch) while the diameter of glass filaments is 20 micrometers to 45 micrometers. Such a diameter may, for example, be measured by analyzing images obtained using an optical microscope. Too high a proportion of large particles could deleteriously affect the arrangement of the filaments and could perturb the organization of the tape too much, reducing its mechanical properties thereby.

Figure 2:
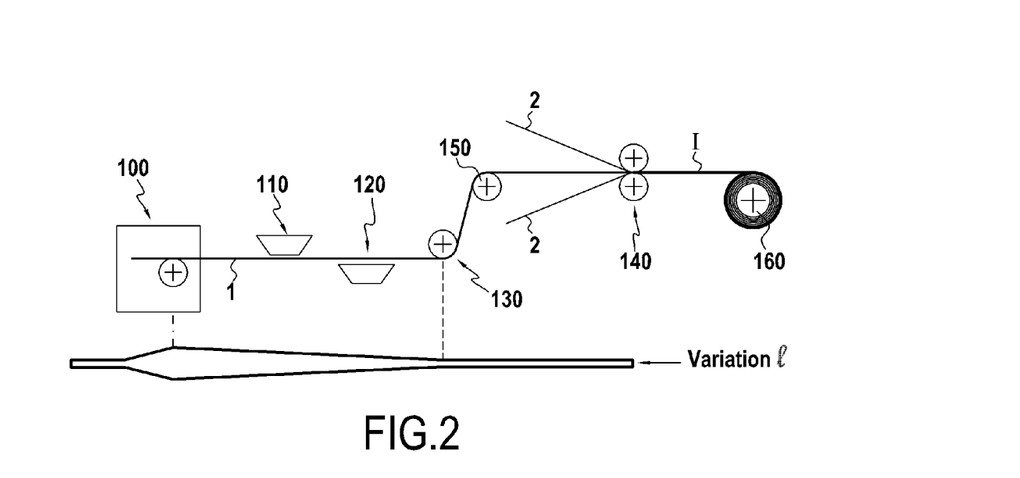
FIG. 2 is a diagrammatic view of the various stations that may be employed in the method of the invention.

In the context of the method of the invention, the tape 1 may pass continuously into a fanning out station 100, a powder application station 110, a heating station 120, a tightening station 130, which may also be termed a calibration station, and finally a station 140 for associating a nonwoven with each of its faces, as illustrated diagrammatically in FIG. 2. In the absence of a traverse winding step, the various steps of the method may be carried out continuously on the same tape, as illustrated in FIG. 2.

The yarn or yarns may be drawn from a spool or may be spread in a fanning out station 100. Various techniques may be used to fan out the tape. An example that may be mentioned is the method described in patent application EP 0 393 420 using rotating oval guide rollers, the methods described in documents U.S. Pat. No. 5,057,338 and JP 11-172562 using suction, the method described in patent application EP 0 467 313 using rotating rods and a loudspeaker, the method described in patent application FR 2 581 086 that uses pins with variable spacing, the methods described in documents FR 1 597 125 and U.S. Pat. No. 6,836,939, which carry out fanning out by blowing, or the method described in patent application EP 0 302 449, which uses vibrating rolls.

Figure 3:
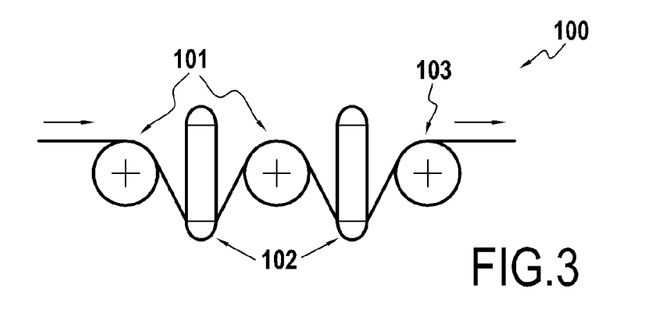
FIGS. 3, 4, and 5 are diagrammatic views respectively of a fanning out station, a powder application station and a calibration station that may be used in the method of the invention.

In particular, a spreading station made up of one or more spreader rods, which may be supplemented at the outlet by one or more rods vibrating in the longitudinal direction, may be used. An example of such a spreading station is illustrated in FIG. 3. In such a device, the reinforcing yarns pass into a series of variable tension rail systems. Each system is made up of a spreader rod 101 and a vibrating rod 102 with a smaller diameter than that of the spreader rod. As an example, the diameter of the spreader rod 101 could correspond to three times that of the vibrating rod. The spreader rod 101 is heated, for example to a surface temperature of 150° C. This heating may be carried out using a resistive cartridge located inside the spreader rod. The vibrating rod 102 is not heated but is provided with a lateral motion perpendicular to the reinforcing yarns, i.e. in the direction of its greatest length. The vibrating rods 102 preferably have a hyperbolic profile to prevent them from buckling under the tension of the reinforcing yarns. Such a variable tension rail system could be multiplied as many times as necessary, in order to adapt the number of spreader rods 101 and vibrating rods 102 (in practice between 2 and 6 depending on the type of yarn used and the desired width and thus weight per unit weight at the outlet), in order to provide a width for the fanned-out yarn, which is preferably equal to at least twice the width of the incoming yarn.

Next, the tape undergoes a powder application operation in order to dispose the powder on at least one face of the tape.

In the continuous method, the width of the tape is not constrained between the fanning out station 100 and the calibration station 130; it is preferable for the powder application station 120 to be located fairly close to the fanning out station in order to be able to profit from the fanned-out width as much as possible. In particular, these two stations are located at a distance such that the reduction in width of the tape between these two stations (more precisely between the fanning out obtained at the outlet from the last spreader rod or the last vibrating rod and the powder deposition zone) is less than 20%.

Figure 4:
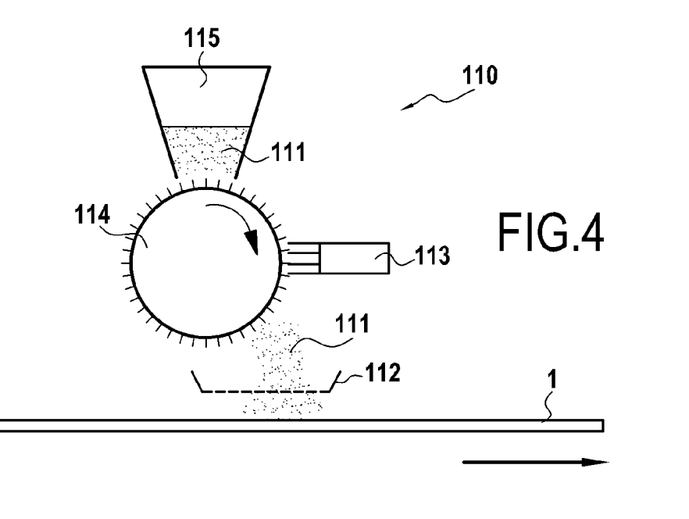

The powder application operation may, for example, be carried out electrostatically or by a more conventional gravimetric route using, for example, a powder application station 110 as illustrated in FIG. 4. The powder 111 is then deposited on the tape 1 that is running past. In order to facilitate homogeneous deposition of the powder 111, the powder is screened onto the yarn 1, for example by means of a vibrating screen 112. As illustrated in FIG. 4, the powder may slowly be poured onto the vibrating screen 112 using an oscillating brush 113 that rakes a rotating pin roller 114 onto which the powder is poured by means of a hopper 115. Preferably, powder application is carried out homogeneously over the tape surface.

The yarn is then heated in a heating station 120 to at least partially soften the powder. In particular, said heating is carried out at a temperature causing the polymeric material making up the powder to melt at least partially, usually at a temperature in the range from the melting point (MPt) of the powder to MPt+30° C. for a thermoplastic powder, and at a temperature in the range from the glass transition temperature (Tg) of the powder to Tg+40° C. with a thermosetting powder, in particular of the epoxy type.

Figure 5:
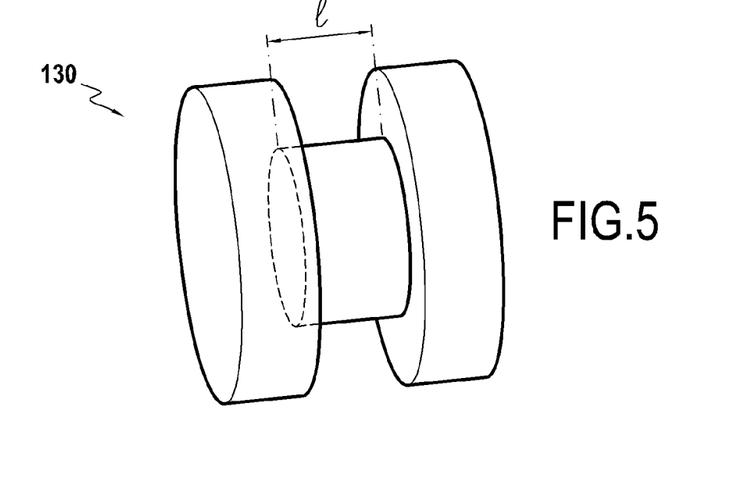

The tightening step is carried out in the calibration station 130 by passing the tape, which is still at a temperature at which the powder is softened, or even at least partially melted, over calibration means: it may be a passage with a given width, in particular in the form of a flat bottomed groove provided on a roller as illustrated in FIG. 5, or a passage provided between two teeth, when a single tape based on one or more yarns is provided, or a calibrating comb defining calibrated passages for a plurality of yarns when one or more tapes are manufactured at the same time. When a sheet is made up of a plurality of yarns, then calibration proper of the width of the sheet is only carried out on the two outermost yarns, the other yarns being guided by a comb located upstream of the spreading element, such that there is no free space between the yarns inside the sheet.

At the outlet from the calibration station 130, the calibrated powdered tape has a quasi-constant width over its entire length that is fixed by cooling. In most circumstances, said cooling does not require the addition of a coolant. It is accomplished simply by allowing the tape to return to ambient temperature, said cooling being initiated from the calibration step, carried out without additional heating compared with that provided in the heating station. The width obtained could then be retained subsequently until the final veiled tape is obtained.

Next, at the outlet from the calibration station 130, each face of the calibrated powdered tape obtained is associated with a nonwoven 2 formed from thermoplastic fibers or thermosetting fibers, for example on a conveyor belt driven by rollers. It is possible to use a return roller 150 to direct the tape towards the lamination station 140, as illustrated in FIG. 2. Usually, the bond between the powdered tape and the nonwovens is provided exclusively by the nonwovens and the powder remaining at the surface, without adding an additional binder. This bond is provided by heating, usually accompanied by pressure, and thus termed thermocompression. To allow the nonwovens to bond with the tape, upstream of being associated with the tape, the nonwovens undergo a heating step involving softening or even melting of the polymer. The width of the nonwoven is selected such that it exceeds the width of the unidirectional sheet on either side. The heating and pressure conditions are adapted to the constituent material of the nonwovens and to their thickness. Usually, a thermocompression step is carried out at a temperature in the range from $T_{MPt\ nonwoven}-15°$ C. to $T_{MPt\ nonwoven}+60°$ C. (where $T_{MPt\ nonwoven}$ designates the melting point of the nonwoven) and at a pressure of 0.1 MPa to 0.6 MPa.

The step of lamination of the nonwovens 2 on the unidirectional carbon material is also vital to proper control of the final thickness of the intermediate product. Depending on the temperature and pressure conditions, especially during lamination, it is possible to modify and thus adjust the thickness of the nonwoven present on each side of the intermediate product. Advantageously, the method of the invention is carried out with a veil as described in patent application WO 2010/046609.

At the outlet from the lamination station, once cooled, the veiled tape I is wound onto a storage spool 160, as illustrated in FIG. 2.

An optional traverse winding step, not shown in FIG. 2, may be inserted between calibration of the tape and association thereof with the nonwovens. This step consists in setting up an angular lag of a few degrees when winding up the powdered strip at a winding rate that depends on said angular lag. In practice, the powdered tape is wound up turn by turn, with the angular lag reducing when it comes to one of the two ends of the winding support. At the end of the winding support, the angular lag of the powdered tape is thus 0°, and the powdered tape is then wound up in the other direction on the lower layer, and so on. This step is of particular use when the weight per unit area of the powder to be applied is low and impossible to achieve at a low velocity. A low weight per unit area application of powder may then be obtained by using a linear velocity for the tape at the powder application station that is substantially higher than the linear velocity of the tape at the station for lamination of the nonwovens. As an example, the linear velocity of the tape could be several tens of meters per minute, for example with electrostatic powder application, using a chamber or under gravity feed as proposed, as opposed to a few meters per minute during the nonwoven lamination step.

The examples below, which are not limiting in nature, can be used to illustrate the invention.

EXAMPLES

Description of Starting Materials

The material used for the tests was as follows:

HT40 F13 carbon yarn from TOHO TENAX. Two weights were obtained: 268 g/m², produced with a yarn of 1600 Tex (24K) and 134 g/m², produced with an 800 Tex (12K) yarn, with a constant width of 5.98 mm.

Figure 6:
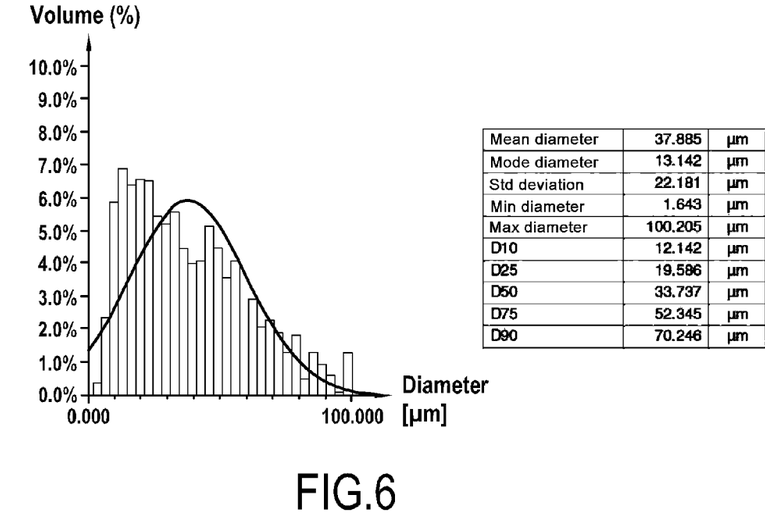
FIG. 6 is a histogram of the volumetric fraction of the powder used in the examples.

7P1610 epoxy powder from AKZO was used with the particle size distribution histogram as a function of the volume of the powder given in FIG. 6. Such a histogram could be obtained after mixing 1.5 mg [milligram] of powder with oil with a viscosity of 952 cps, observing the image of the mixture using an Olympus (Olympus France, 74 rue d'Arcueil BP90165, 94533 Rungis Cedex) binocular microscope with a magnification of ×10, and analysis of the acquired image using Granix software (Microvision CE 1750—Z.I. Petite Montagne Sud—8 rue du Forez—91047 EVRY Cedex). The histogram was obtained using Granix software, which carried out contactless electronic screening.

1R8D06 polyamide veil sold by Protechnic, (66, rue des Fabriques, 68702—CERNAY Cedex—France) was used. Different densities of powder in the range 0 to 5% were applied to the yarns.

In accordance with the invention, the yarn was fanned out, powdered, heated and calibrated, cooled then veiled by passing through the various stations continuously, as illustrated diagrammatically in FIG. 2. The fanning out station determined the advance velocity of the yarn.

1. Fanning Out:

This was the first step in the method. The fanning out station used comprised 4 variable tension rail systems as illustrated in FIG. 3. The carbon yarns described above passed through a series of 4 variable tension rail systems. Each system was made up of a large diameter spreader rod (15 mm) and a small diameter vibrating rod (5 mm). The spreader rods were heated to a surface temperature of 150° C. using a cartridge located inside them. The vibrating rods were not heated, but provided with a lateral motion perpendicular to the reinforcing yarns and thus in the direction of their greatest length, at a frequency of 10 Hz [Hertz] with a travel of 5 mm. The small radius vibrating rods had a hyperbolic profile in order to avoid buckling of the rod under the tension of the reinforcing yarns. This tension was adjusted by the brake on the creel on which the initial spools were located, to 200 cN [centinewtons] per reinforcing yarn.

At the outlet from the fanning out step, a minimum width was obtained as follows:

45 mm for the 12K yarn;
60 mm for the 24K yarn.

The velocity of the line was given by the fanning out step, i.e. 2 m/min.

2. Powder Application:

Powder application was carried out gravimetrically on a "Schaetti Line" (Schaetti & Co., CH8304 Wallisellen, Swizerland). The parameters used were as follows:
- brush velocity: 935 rpm [revolutions per minute];
- motor velocity: rotational velocity of pin roller:

12K:
- 22 rpm for 1.25%;
- 44 rpm for 2.5%;
- 66 rpm for 3.75%;
- 66 rpm for 5%;
- 88 rpm for 5%;

24K:
- 44 rpm for 1.25%;
- 88 rpm for 2.5%;
- 132 rpm for 3.75%;
- 176 rpm for 5%;
- width of yarn during passage through powder application machine. These widths were below the above values as the width of the spread yarn was not constrained between the outlet from the spreading station and the calibration station. The powder application zone thus had to be located as close to the spreading zone as possible in order to be as wide as possible.
  - 12K: 32 mm;
  - 24K: 42 mm;
- ambient temperature in the range 18° C. to 22° C.;
- relative humidity in the range 22% to 26%.

3. Heating-Calibration:

This step was used to fix the powder on the spread yarn by heating, then by cooling during the yarn width calibration phase. Thus, a tape was obtained with a width that was close to that taken off the spool (before fanning out) and which contained powder distributed uniformly throughout its thickness. To this end, the heating was carried out with two arrays of two 500 W [watt] short infrared lamps, each spaced 100 mm apart at a distance of 50 mm from the yarn and adjusted to 0.08 (8% load). At the outlet from this heating station, the yarn was passed over a rotating calibration roller formed from ceramic having a groove with a width of 5.98 mm (the width is identical for a 12K and a 24K yarn, the final weight per unit area being doubled for 24K: 268 g/m$^2$ instead of 134 cm$^2$). The distance between the fanning out outlet roller and the calibration roller was 2200 mm and the temperature of the calibration roller support was 105° C. to 110° C.

4. Lamination of Veil:

The veil was bonded in accordance with the disclosure of patent WO 2010/061114, in particular using the conditions given in the examples of that document.

5. Control of Production:

A 28 m sample was taken at the start and end of production for each configuration. The weight obtained was compared with the theoretical weight of the yarn in order to obtain the powder content. The 0% weight was used to check that the weight was stable and that the yarn remained true to weight. The Following were Produced:
- 3 times 100 m of 12K with a percentage by weight of powder of 0%-1.25%-2.50%-3.75% and 5.00%;
- 3 times 100 m of 24K with a percentage by weight of powder of 0%-1.25%-2.50%-3.75% and 5.00%;

The 0% measurement was carried out under the same conditions, but the powder application station was stopped.

FIG. 2 is a diagrammatic illustration of the production line for the yarn from fanning it out to its arrival in the nonwoven lamination station.

Performance Tests

Test Protocol and Modeling

Specimens:

The specimens were produced from a yarn of known length, laminating an adhesive 100 mm tape onto its two opposed faces. The force was exerted by a draw rig by means of adhesive tapes.

The total loaded length was from 200 mm to 300 mm for the high values. For each of the conditions, five specimens were tested.

The mathematical model used was an excellent model since it could account for the performances with a reliability of 92% and predict the simulations with 88% confidence.

Characteristics of Products Obtained

"Yarn Length" Factor:

Logically, the length of the yarn to be delamination tested should have an influence on the performances. It was in fact observed that the longer the specimen, the smaller the shear stress and the force was distributed over a greater length.

"Yarn Weight Per Unit Area" Factor:

In contrast, the weight per unit area of the yarn was observed to have little influence on performance.

Figure 7:
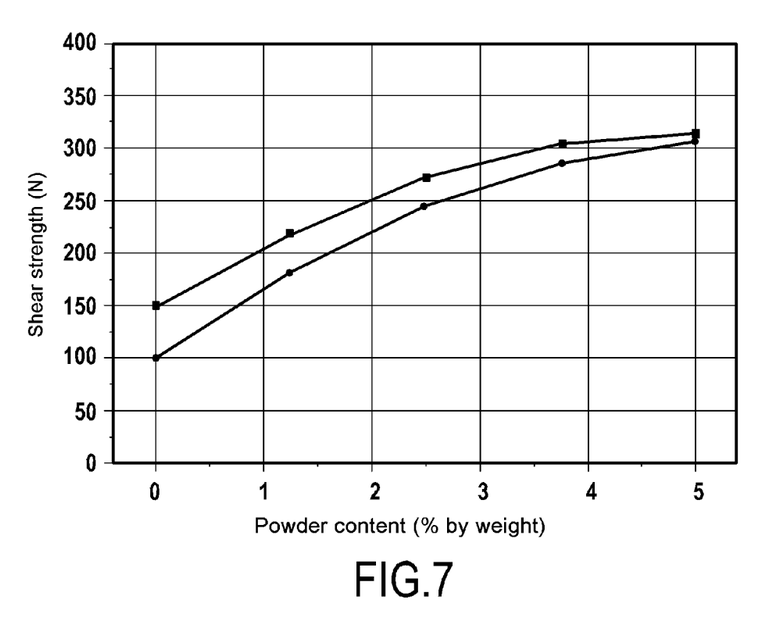
FIG. 7 represents the shear strength of yarns of the invention as a function of the powder content.

"Yarn Powder Application" Factor:

This is the most important factor. An improvement in performance was observed with the powder content. FIG. 7 represents the performances obtained with 12K and 24K yarns as a function of the powder content.

It was observed that delamination performance improved with the presence of powder up to a certain threshold.

Figure 8:
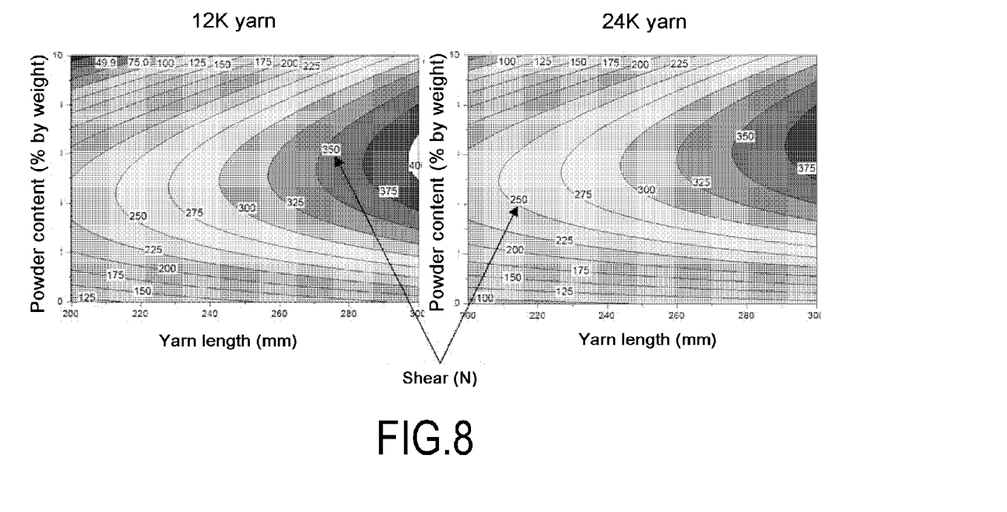
FIG. 8 represents the extrapolation of the influence of the powder content as a function of yarn length using 12K [count] and 24K yarns.

The influence of increasing the powder content was simulated. FIG. 8 represents the extrapolation for 12K and 24K yarns up to 10% by weight of powder.

"Powder Content"+"Weight Per Unit Area" Interaction:

The influence of two combined factors: "powder content"+"weight per unit area" was studied. It appears that there was no interaction between the two; the powder content had substantially the same influence for a low weight per unit area (■) and for a high weight per unit area (●), as illustrated in FIG. 7.

CONCLUSION

Figure 9:
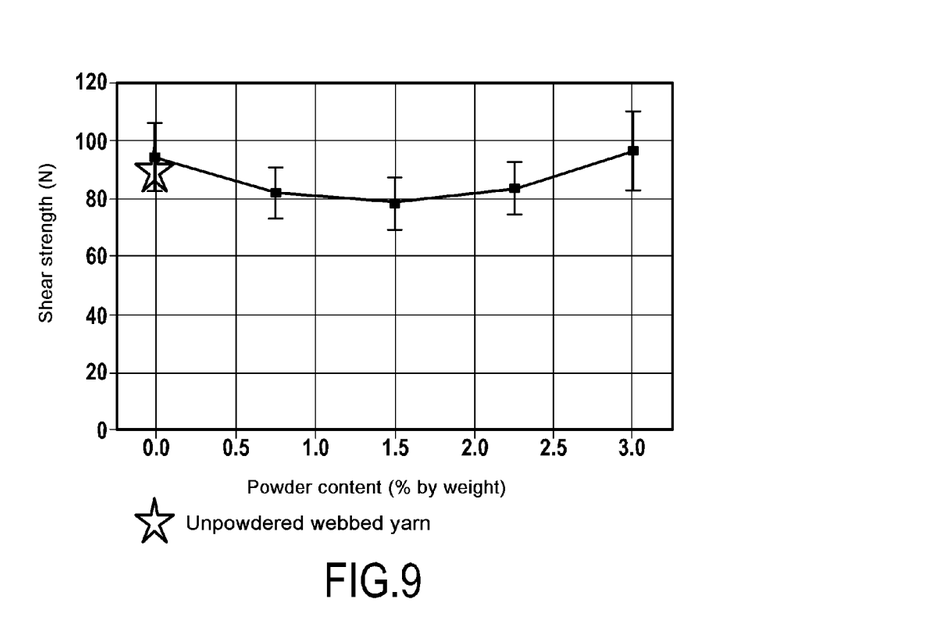
FIG. 9 is given by way of comparison and represents the change in the shear strength of an unpowdered veiled yarn and a veiled yarn powdered at the surface only and not in the core in accordance with the invention.

Powder in the core of the yarn has a considerable influence on resistance to delamination. This influence was identical irrespective of the weight per unit area of the yarn. By way of comparison, powder was applied to the surface of a veiled yarn: such surface application did not show any improvement in the resistance to delamination performance. The unpowdered veiled yarn behaved like the surface powdered veiled yarn, as illustrated in FIG. 9, which corresponded to the 12K veiled yarn powdered only at the surface (thus without fanning out—tightening step). The star corresponds to the corresponding non-powdered veiled yarn. In other words, adding powder to the surface only does not add any resistance to delamination. This is explained by the fact that delamination affects inter-fiber cohesion inside the yarn.

Further, it has been established that the delamination performance increased, as is logical, with the length of the yarn.

Further, a capping tendency was also observed, which tends to prove that it is useless to increase the powder content beyond 8% by weight.

The invention claimed is:

1. A method of preparing a veiled tape that is resistant to delamination, the method comprising the following steps in succession:

a) providing a tape having an outer surface that is formed by a top side, bottom side, left edge and right edge, said tape having a thickness between said top side and bottom side, a width between said left edge and said right edge and an inside that is bounded by the top side, bottom side, left edge and right edge of said tape, said tape comprising reinforcing filaments extending in a direction substantially parallel to the length of the tape and inter-filament spaces located in the inside of said tape;

b) combining a powder with said tape, said powder comprising particles that comprise a polymeric material, wherein said particles are heated to partially soften said particles and form a heated powdered tape;

c) forming a calibrated powdered tape by simultaneously reducing the width and increasing the thickness of said heated powdered tape to form said calibrated powdered tape having an outer surface that is formed by a top side, bottom side, left edge and right edge of said calibrated powdered tape, said calibrated powdered tape having a thickness between the top side and bottom side of said calibrated powdered tape and a width between the left edge and right edge of said calibrated powdered tape, the width of said calibrated powdered tape being less than the width of said tape and the thickness of said calibrated powdered tape being greater than the thickness of said tape, wherein the size of said particles is sufficiently small so that a portion of said particles enters said inter-filament spaces during the combining step and the forming step to provide a calibrated powdered tape in which at least 30% by weight of said particles are not in contact with the outer surface of said tape; and d) bonding a nonwoven formed from polymeric fibers to the top side of said calibrated powdered tape and bonding a nonwoven formed from polymeric fibers to the bottom side of said calibrated powdered tape to form said veiled tape that is resistant to delamination.

2. A method according, to claim 1, wherein when the width of the tape is more than 50% larger, or even at least 100% larger than the width of said calibrated powdered tape.

3. A method according to claim 1, which includes a step of fanning out the tape prior to step a).

4. A method according to claim 1 which is carried out on a continuous production line, at least to the outlet from step c).

5. A method according to claim 3, wherein the width of the tape at the start of step a) is at least 20% less than the width of the tape obtained after fanning out.

6. A method according to claim 1 which includes a traverse winding step between steps c) and d).

7. A method according to claim 1 wherein the weight of the powder represents 0.5% to 8% of the total weight of the veiled tape.

8. A method according to claim 1 wherein the total weight of nonwovens represents less than 15% of the total weight of the veiled tape.

9. A method according to claim 1 wherein the width of the nonwovens associated with the calibrated powdered tape in step d) is greater than the width of the calibrated powdered tape.

10. A method according to claim 1 wherein the filaments are formed from a material selected from the following materials: carbon, glass, aramid, silica, ceramic, and mixtures thereof.

11. A method according to claim 1 wherein the nonwoven and the powder are formed from a material selected from polyamides, copolyamides, polyamides—block ether or ester, polyphthalamide, polyesters, copolyesters, thermoplastic polyurethanes, polyacetals, polyolefins, polyethersulfones, polysulfones, polyphenylene sulfones, polyetheretherketones, polyetherketoneketone, poly(phenylene sulfide), or polyetherimides, thermoplastic polyimides, liquid crystal polymers, phenoxys, block copolymers such as styrene-butadiene-methylmethacrylate copolymers, methylmethacrylate—butyl acrylate—methylmethacrylate copolymers, epoxies and mixtures thereof.

12. A method according to claim 1 wherein said powder comprises particles having a mean particle size ranging from 10 micrometers to 70 micrometers.

13. A method according to claim 1 wherein said filaments are carbon filaments having a diameter of from 2 micrometers to 50 micrometers.

14. A method according to claim 1 wherein said filaments are glass filaments having a diameter of from 20 micrometers to 45 micrometers.

15. A method according to claim 13 wherein said powder comprises particles having a mean particle size ranging from 10 micrometers to 70 micrometers.

16. A method according claim m 15 wherein said powder comprises particles having a mean particle size ranging from 10 micrometers to 70 micrometers.

17. A method according to claim 15 wherein the mean particle size of said particles does not exceed 5 times the diameter of said carbon filaments.

18. A method according to claim 16 wherein the mean particle size of said particles does not exceed 5 times the diameter of said glass filaments.

19. A method according to claim 1 wherein the weight of the powder represents 1% to 4% of the total weight of the veiled tape.

20. A method according to claim 19 wherein the total weight of nonwovens represents from 2% to 10% of the total weight of the veiled tape.

* * * * *